Patented July 4, 1939

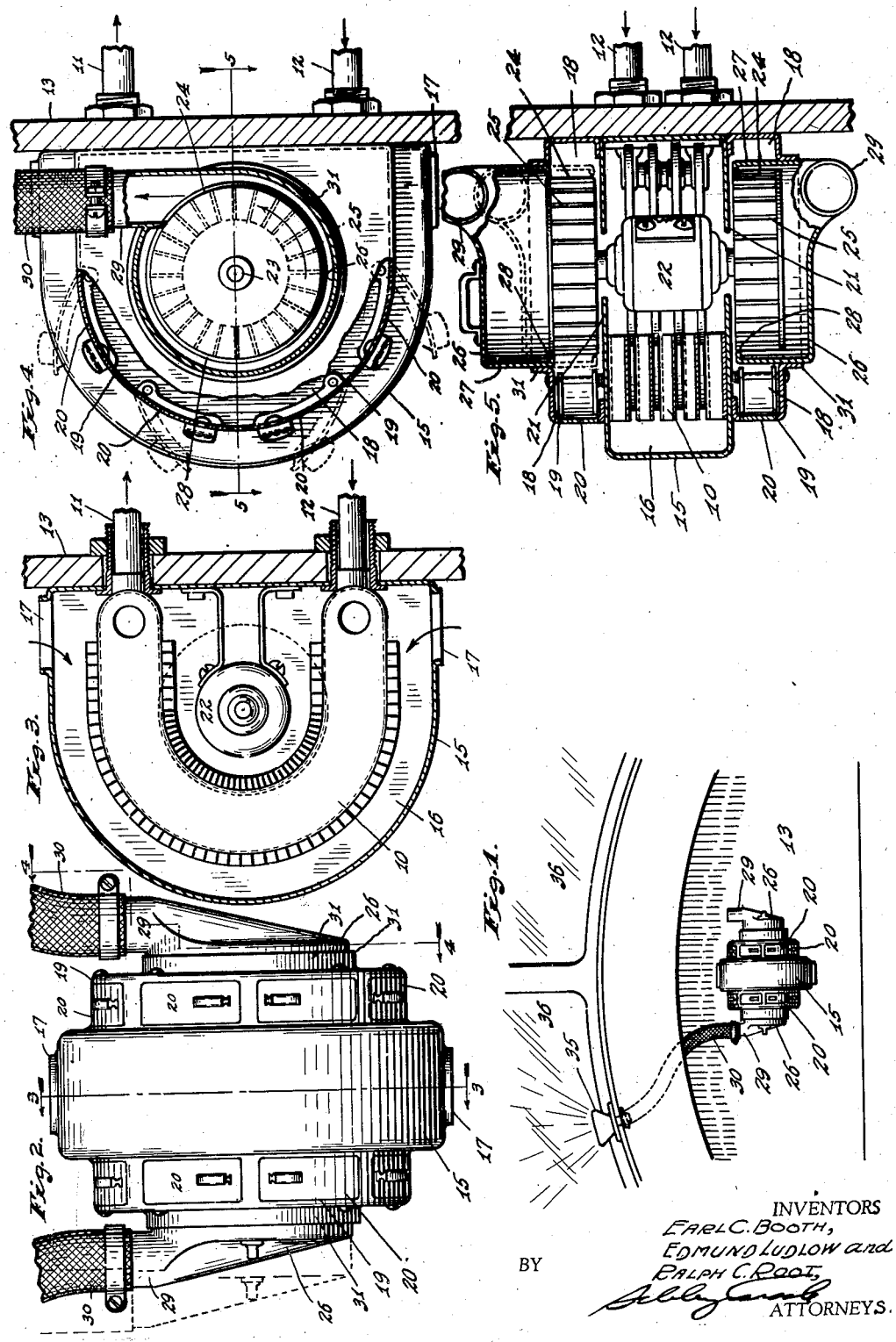

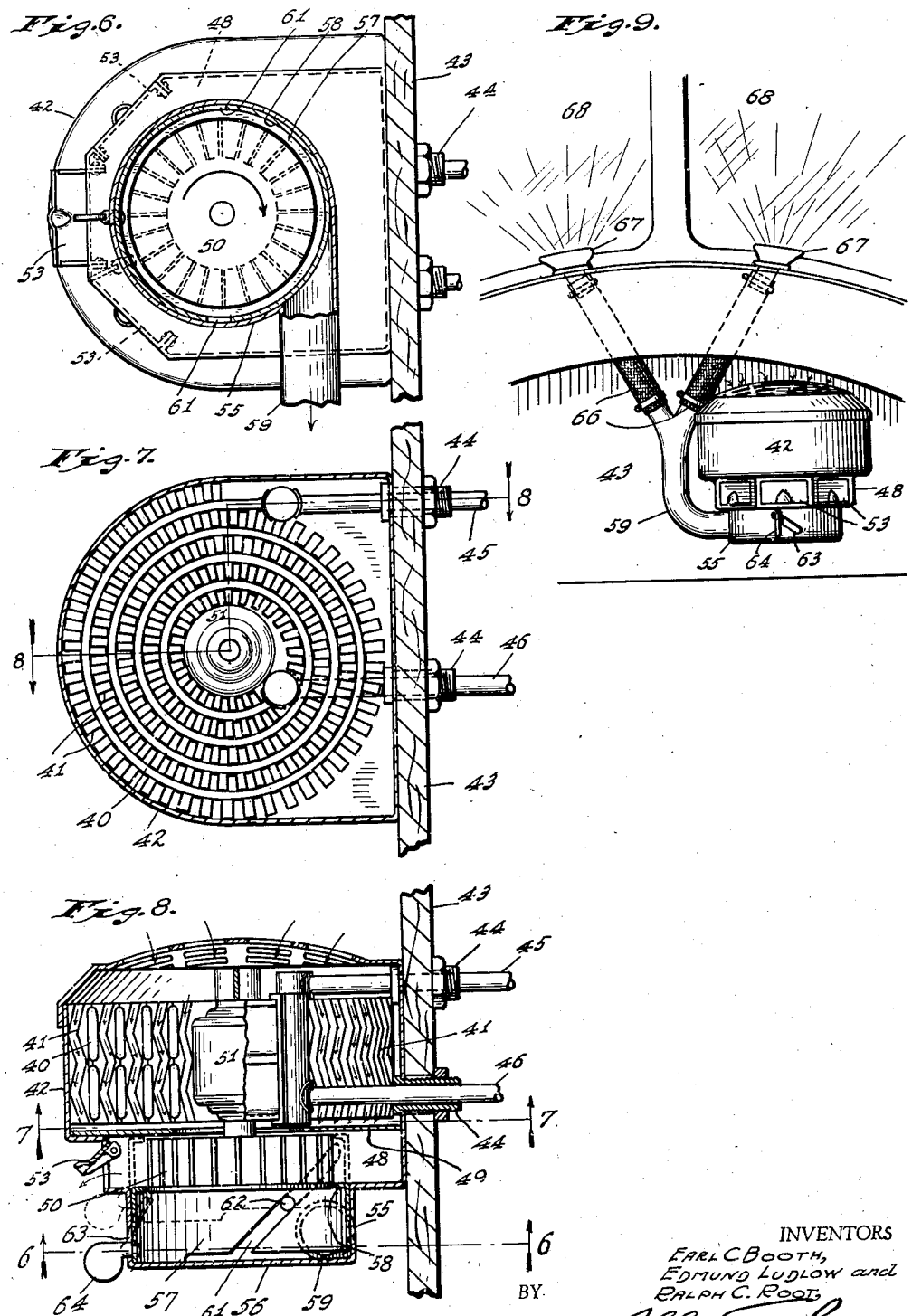
July 4, 1939. E. C. BOOTH ET AL 2,164,854
HEATER
Filed Nov. 15, 1937 2 Sheets-Sheet 2
INVENTORS
EARL C. BOOTH,
EDMUND LUDLOW and
RALPH C. ROOT
BY
ATTORNEYS.

2,164,854

UNITED STATES PATENT OFFICE 2,164,854

HEATER

Earl C. Booth and Edmund Ludlow, Columbus, and Ralph C. Root, Indianapolis, Ind., assignors to Noblitt-Sparks Industries, Inc., Columbus, Ind., a corporation of Indiana Application November 15, 1937, Serial No. 174,586

10 Claims. (Cl. 257—137)

Our invention relates to automobile-body heaters of the circulating fluid type and has for its object the production of a heater which will discharge streams of heated air into the body of the car to warm the interior thereof and which, at the same time, will deliver one or more auxiliary air streams to specific locations, as against the windshield to defrost it. More specifically, it is our object to produce a heater of this type in which the air streams will be delivered under an appreciable positive pressure. A further object of our invention is to provide means for adjustably proportioning the total quantity of air delivered by the heater between the main and auxiliary streams.

In carrying out our invention we provide a heat-exchanging core adapted to be connected to the cooling-water system of the automobile engine and, in association with such core, we provide air-impelling means of the blower type arranged to move air through the core. The heater is provided with a core-enclosing casing having one or more openings for the delivery of the main air stream from the air-impelling means, and also having an auxiliary discharge opening communicating with a suitable conduit extending to a defroster nozzle. An air-dividing member surrounds the blower and is adjustable axially thereof to proportion the air between the main and auxiliary discharge openings. The auxiliary discharge opening may be provided in a blower housing which, in its entirety, is adjustable axially of the blower; or, in another of many possible arrangements, the auxiliary opening may be located in a cylindrical extension of the main casing and the air dividing member may take the form of an axially adjustable sleeve mounted in such casing-extension and movable axially to overlap the blower to any desired extent.

The accompanying drawings illustrate our invention: Fig. 1 is an elevation of the dash of an automobile with the heater mounted thereon; Fig. 2 is a front elevation of the heater on a larger scale; Figs. 3 and 4 are vertical sections on the lines 3—3 and 4—4 respectively of Fig. 2; Fig. 5 is a horizontal section on the line 5—5 of Fig. 4; Fig. 6 is a horizontal section on the line 6—6 of Fig. 8 and illustrates a modified form of the invention; Fig. 7 is a horizontal section on the line 7—7 of Fig. 8; Fig. 8 is a vertical section on the line 8—8 of Fig. 7; and Fig. 9 is an elevation of the dash of an automobile with the heater of Figs. 6–8 mounted thereon.

In the arrangement shown in Figs. 1-5, the core 10 of the heater is semicircular in shape. It may be constructed in accordance with the disclosure of the co-pending Ludlow and Booth patent application Serial No. 144,453, filed May 24, 1937. Connected to opposite ends of the core are supply and discharge conduits 11 and 12 which project through the dash 13 of the automobile in order that the core may be connected into the circulating system through which the cooling water of the automobile flows.

The core 10 is disposed within a casing 15 which, generally, corresponds in shape to the core and which is spaced radially from the core to provide a passage 16 for air entering the casing through air-inlet openings 17 desirably disposed near the dash. The casing 15 has extensions which project axially beyond the core 10 to form chambers 18 disposed on opposite sides of the core; and in the walls of such chambers there are provided openings 19 through which air may be discharged into the interior of the automobile body. Adjustable closures 20 associated with the openings 19 permit regulation of the quantity and direction of the air discharged from the chambers 18. Each chamber is separated from the central or core-containing portion of the casing 15 by a partition 21.

Within the core 10 we mount means, desirably an electric motor 22, for driving the air-impelling means. Conveniently, the motor is arranged with its shaft 23 parallel to the axis of the core 10 and projecting through air-passing openings in the partitions 21 into the chambers 18 where there are mounted upon it blower elements 24 having generally radial air-impelling blades 25.

In each end wall of the casing there is provided an opening for the reception of a blower housing 26. Each housing, as shown, is formed with a circular side wall 27 the inner edge of which is turned inwardly to form an annular flange 28 having an internal diameter only slightly larger than the diameter of the blower 24. Outside the casing 15, each of the blower housings 26 is provided with a tangential air-outlet 29 to which there may be connected a conduit 30 of a windshield defroster.

At least one of the blower housings 26 and its associated blower 24 are arranged for relative axial adjustment. To this end, the inner edge of the housing-receiving opening in the casing may be bent to form an annular flange 31 which frictionally engages the side wall 27 of the housing 26 with sufficient force to hold it in any position of adjustment but, at the same time, to permit a change in its axial position.

It will be apparent that, other things being equal, the amount of air delivered through the outlet 29 of either housing 26 will depend upon the extent to which that housing overlaps axially its associated blower 24. If the housing 26 is withdrawn beyond the blower 24, as indicated in full lines at the top in Fig. 5, all the air delivered by the blower will be discharged into the chamber 18 and delivered therefrom through the openings 19; but if the housing 26 is moved inwardly to a point such that the flange 28 overlaps the blower 24, a portion of the air delivered by the blower will be collected in the housing and discharged through the outlet 29. Thus, the quantity of air delivered by each blower can be proportioned as desired between the outlets 19 and 29.

The preferred location for the heater above described is near the middle of the dash of the automobile, with the shaft of the motor 22 disposed horizontally and parallel to the dash and with the blower-housing outlets 29 projecting upwardly close to the dash. With the heater thus arranged, the connection of the conduits 30 to defroster nozzles 35 disposed adjacent the windshield 36 is facilitated and free delivery of heated air through the openings 19 into the interior of the automobile-body is obtained.

In the modification of our invention illustrated in Figs. 6 to 9 inclusive, the core consists of a tube 40 of elongated cross-section wound spirally with its turns spaced apart and with finning 41 disposed between the spaced-apart turns and over the outer side surfaces of the core. The core is disposed within a casing 42 which is clamped to the dash 43 of the automobile by bushings 44. Supply and discharge conduits 45 and 46 communicate respectively with the ends of the tube 40 and extend through the bushings 44.

The casing 42 projects downwardly below the core to form a chamber 48 separated from the core-containing portion of the casing by a partition 49. Within the chamber 48 there is located a rotatable blower element 50 driven by an electric motor 51 disposed in the interior of the core. The top of the casing 42 is in the form of a grill providing openings for the admission of air which, after passing downwardly through the core, flows through a central opening in the partition 49 to the blower 50.

In the side wall or walls of the chamber 48, we provide main air-discharge openings with each of which there may be associated a combined closure and deflecting member 53. Desirably, these closures are in the form of shutters pivotally attached to the casing 42 on horizontal axes near their upper edges so that, when adjusted to an inclined position such as is illustrated in Fig. 8, they will deflect the discharged air downwardly toward the feet of the occupants of the automobile.

The bottom wall of the chamber 48 is formed with a downwardly extending circular projection 55 having a closed bottom 56. Within the casing-projection 55, which is co-axial with the blower 50 and of somewhat larger diameter, there is mounted an axially adjustable sleeve 57 having at its upper end an in-turned peripheral flange 58 that has an internal diameter only slightly larger than the diameter of the blower. An auxiliary air-discharge conduit 59 communicates with the interior of the casing-projection 55, and is desirably arranged tangentially thereof.

To provide for the axial adjustment of the sleeve 57, it may be provided with one or more helical slots 61 each of which receives a pin or other projection 62 secured to the circular wall of the casing-projection 55. At the front of the heater, the circular wall of the casing-projection 55 is provided with a similar helical slot 63 through which there extends an operating handle 64 secured to the sleeve 57. By employing the handle 64 to rotate the sleeve 57, the axial position of the sleeve 57 can be controlled to vary the proportions in which air discharged from the blower 50 is divided between the conduit 59 and the main air-discharge openings 50.

The heater of Figs. 6 to 9 may be mounted on the dash 43 in the position illustrated in Fig. 9, the auxiliary air-discharge conduit extending upwardly along one side of the heater and being branched at its top for connection to a flexible conduit 66 leading to air-discharge nozzles 67 disposed adjacent the automobile windshield 68.

The terms "blower" and "blower-element" are used herein to distinguish that type of rotating air impeller in which the air is delivered generally in a plane perpendicular to the axis of rotation, as distinguished from a fan which delivers air axially.

We claim as our invention:

1. In a heater of the circulating fluid type, a generally semicircular core, a casing having a side wall spaced radially outwardly from said core to provide a passage for entering air, said casing being provided with one or more openings for the admission of air to said passage, a motor disposed within said core and having a shaft parallel to the core-axis, blower elements mounted on opposite ends of said motor-shaft to receive air from within said core and to deliver it outwardly, the side wall of the casing projecting axially beyond the ends of said core and having openings for the delivery of air from said blower elements, and blower housings respectively associated with said blower elements, each of said blower housings partially overlapping its associated blower element axially to receive a portion of the air delivered therefrom and being adapted for connection to a conduit leading to a remote point.

2. In a heater of the circulating fluid type, a generally semicircular core, a casing having a side wall spaced radially outwardly from said core to provide a passage for entering air, said casing being provided with one or more openings for the admission of air to said passage, a motor disposed within said core and having a shaft parallel to the core-axis, blower elements mounted on opposite ends of said motor-shaft to receive air from within said core and to deliver it outwardly, the side wall of the casing projecting axially beyond the ends of said core and having openings for the delivery of air from said blower elements, and blower housings respectively associated with said blower elements, each of said blower housings being adapted for connection to a conduit leading to a remote point, at least one of said housings being axially adjustable.

3. In a heater of the circulating fluid type, a generally semicircular core, a casing having a side wall spaced radially outwardly from said core to provide a passage for entering air, said casing being provided with one or more openings for the admission of air to said passage, a motor disposed within said core and having a shaft parallel to the core-axis, the side wall of said casing extending beyond one end of said core and being there provided with one or more air-discharge openings a blower-element mounted on said motor shaft within such extension, and a blower housing adapted for connection to a conduit leading to a remote point, said blower housing and blower element being relatively axially adjustable.

4. In a heater of the circulating-fluid type, a casing having a partition dividing the interior of the casing into two compartments, a core in one of said compartments, a rotatable blower element disposed adjacent and substantially parallel to said partition in the other of said compartments, means for rotating said blower, said casing being provided with openings for the admission of air to the core-containing compartment and for the delivery of air from the blower-containing compartment, said partition having in alinement with said blower an opening for the passage of air from said core-containing compartment to said blower, and a blower housing adapted for connection to a conduit leading to a remote point, said blower housing and blower element being relatively axially adjustable.

5. In a heater of the circulating fluid type, a casing having inlet and main discharge openings for air, a core for heating air passing through said casing, a rotating blower element for moving air through said core, and a blower housing provided with an air-discharge opening, said blower-housing being axially adjustable over a range including a position in which said housing partially overlaps said blower, that portion of said blower not overlapped by said housing being exposed within said casing whereby air discharged therefrom will flow through said casing and the main discharge opening thereof.

6. In a heater of the circulating fluid type, an air-heating core, a rotatable blower element for moving air through said core, and means having main and auxiliary discharge openings for collecting the air discharged from said blower element, said means including a member surrounding said blower element and adjustable axially thereof to regulate the division of air between said main and auxiliary openings.

7. In a heater of the circulating fluid type, a casing having inlet and main discharge openings for air, a core for heating air passing through said casing, a rotating blower element for moving air through said core, and a blower housing provided with an air-discharge opening, said blower-element and housing being relatively axially adjustable over a range including a position in which said housing partially overlaps said blower, that portion of said blower not overlapped by said housing being exposed within said casing whereby air discharged therefrom will flow through said casing and the main discharge opening thereof.

8. In a heater of the circulating fluid type, an air-heating core, a rotatable blower element for moving air through said core, and means having main and auxiliary discharge openings for collecting the air discharged from said blower element, said means including a member surrounding said blower element and dividing the air discharged therefrom between said main and auxiliary discharge openings, said member and blower element being relatively adjustable axially of the blower element to regulate the division of air between said main and auxiliary openings.

9. The invention set forth in claim 8 with the addition that said member is in the form of a sleeve coaxial with said blower and adjustable axially thereof.

10. In a heater of the circulating fluid type, a casing having inlet and main air outlet openings, a rotatable blower for drawing air through said core and discharging it through said outlet openings, the end wall of said casing in line with said blower being provided with an inwardly opening circular recess, an auxiliary air conduit communicating with said recess, and a circular sleeve slidable in said recess into and out of axially overlapping relation with said blower.

EARL C. BOOTH.
EDMUND LUDLOW.
RALPH C. ROOT.